United States Patent
Toda et al.

(10) Patent No.: US 9,855,763 B2
(45) Date of Patent: Jan. 2, 2018

(54) INK FOR INKJET AND INKJET RECORDING METHOD

(71) Applicants: Naohiro Toda, Kanagawa (JP); Tomohiro Nakagawa, Kanagawa (JP); Hidefumi Nagashima, Kanagawa (JP); Juichi Furukawa, Kanagawa (JP); Masahiro Kido, Kanagawa (JP); Hikaru Kobayashi, Kanagawa (JP)

(72) Inventors: Naohiro Toda, Kanagawa (JP); Tomohiro Nakagawa, Kanagawa (JP); Hidefumi Nagashima, Kanagawa (JP); Juichi Furukawa, Kanagawa (JP); Masahiro Kido, Kanagawa (JP); Hikaru Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/821,958

(22) Filed: Aug. 10, 2015

(65) Prior Publication Data
US 2016/0068697 A1    Mar. 10, 2016

(30) Foreign Application Priority Data

Sep. 4, 2014 (JP) ................................. 2014-180017

(51) Int. Cl.
*B41J 2/21*          (2006.01)
*C09D 175/04*        (2006.01)
(Continued)

(52) U.S. Cl.
CPC ........... *B41J 2/2107* (2013.01); *C09D 11/322* (2013.01); *C09D 11/38* (2013.01); *C09D 175/04* (2013.01); *C09D 175/08* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| | | | |
|---|---|---|---|
| 2008/0087188 A1* | 4/2008 | Kabalnov | C09D 11/40 106/31.6 |
| 2011/0069111 A1* | 3/2011 | Matsumoto | C09D 11/30 347/100 |
| 2011/0281988 A1* | 11/2011 | Tanoue | C09D 11/40 524/386 |
| 2012/0262517 A1* | 10/2012 | Takaku | C09D 11/322 347/20 |
| 2014/0192112 A1 | 7/2014 | Nagashima et al. | |
| 2014/0267520 A1 | 9/2014 | Toda et al. | |
| 2014/0377516 A1 | 12/2014 | Toda et al. | |
| 2015/0017396 A1 | 1/2015 | Nakagawa et al. | |
| 2015/0050467 A1 | 2/2015 | Nakagawa et al. | |
| 2015/0077479 A1 | 3/2015 | Nakagawa et al. | |
| 2015/0077482 A1 | 3/2015 | Toda et al. | |

(Continued)

FOREIGN PATENT DOCUMENTS

| | | |
|---|---|---|
| JP | 2003-147241 | 5/2003 |
| JP | 2005-220352 | 8/2005 |

(Continued)

OTHER PUBLICATIONS

U.S. Appl. No. 14/643,639, filed Mar. 10, 2015.

*Primary Examiner* — Manish S Shah
(74) *Attorney, Agent, or Firm* — Oblon, McClelland, Maier & Neustadt, L.L.P.

(57) ABSTRACT

An ink for inkjet includes water; two or more hydrosoluble organic solvents; a pigment; and a resin particle more than the pigment by weight. A hydrosoluble organic solvent A having the smallest SP value and a hydrosoluble organic solvent B having the largest SP among the two or more hydrosoluble organic solvents satisfy the following relations (1) and (2):

SP value of hydrosoluble organic solvent $B$–SP value of hydrosoluble organic solvent $A \geq 3$    (1)

boiling point of hydrosoluble organic solvent $B$ > boiling point of hydrosoluble organic solvent $A$    (2).

18 Claims, 2 Drawing Sheets

(51) Int. Cl.
*C09D 175/08* (2006.01)
*C09D 11/322* (2014.01)
*C09D 11/38* (2014.01)

(58) Field of Classification Search
CPC .... B41J 2/1755; B41J 2/2114; B41J 11/0015; B41J 11/002; B41J 2/2056; B41J 2/21; B41J 2/0057; B41J 3/60; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................................. 347/95–105
See application file for complete search history.

(56) References Cited

U.S. PATENT DOCUMENTS

| | | | |
|---|---|---|---|
| 2015/0116433 | A1 | 4/2015 | Fujii et al. |
| 2015/0165787 | A1 | 6/2015 | Fujii et al. |
| 2015/0191614 | A1 | 7/2015 | Nagashima et al. |

FOREIGN PATENT DOCUMENTS

| | | |
|---|---|---|
| JP | 2011-094082 | 5/2011 |
| JP | 2013-177513 | 9/2013 |

* cited by examiner

INK FOR INKJET AND INKJET RECORDING METHOD

CROSS-REFERENCE TO RELATED APPLICATIONS

This patent application is based on and claims priority pursuant to 35 U.S.C. §119 to Japanese Patent Application No. 2014-180017, filed on Sep. 4, 2014, in the Japan Patent Office, the entire disclosure of which is hereby incorporated by reference herein.

BACKGROUND

Technical Field

The present invention relates to an ink for inkjet and an inkjet recording method.

Description of the Related Art

Since inkjet printers are relatively quiet, enjoy low running costs, and are capable of easily printing color images, they are now widely used at home as the output device of digital signals.

In recent years, inkjet technologies have been appealing in business field of, for example, display, posters, and signboards in addition to home use.

As the ink for inkjet recording for use in business fields, solvent-based inkjet ink containing a resin dissolved in an organic solvent as a vehicle or ultraviolet-curable inkjet ink using a polymerizable monomer as its main component have been widely used.

However, a large amount of the solvent of the solvent-based inkjet ink evaporates into air, which is not preferable in terms of burden on environment. Moreover, some ultraviolet curable inkjet ink have skin sensitization potential. In addition, since an ultraviolet ray irradiator built in a printer is expensive, the application field of the solvent-based inkjet is limited.

In this backdrop and considering it is less burden on the environment, inkjet technologies using an aqueous ink widely used at home have been developed for industrial use as disclosed in Japanese published unexamined applications Nos. JP-2005-220352-A and JP-2011-094082-A.

However, when an aqueous ink is applied to a nonpermeable media such as film substrates different from conventional paper media in particular, a conventional method of increasing glossiness of images on paper media as disclosed in Japanese Patent No. JP-3972637-B2 tends to have deterioration of the glossiness thereof.

SUMMARY

Accordingly, one object of the present invention is to provide an ink for inkjet capable of producing images having high glossiness when applied on nonpermeable media.

Another object of the present invention is to provide an inkjet recording method using the ink.

These objects and other objects of the present invention, either individually or collectively, have been satisfied by the discovery of an ink for inkjet, including water; two or more hydrosoluble organic solvents; a pigment; and a resin particle more than the pigment by weight, wherein a hydrosoluble organic solvent A having the smallest SP value and a hydrosoluble organic solvent B having the largest SP among the two or more hydrosoluble organic solvents satisfy the following relations (1) and (2):

$$SP \text{ value of hydrosoluble organic solvent } B - SP \text{ value of hydrosoluble organic solvent } A \geq 3 \quad (1)$$

$$\text{boiling point of hydrosoluble organic solvent } B > \text{boiling point of hydrosoluble organic solvent } A \quad (2).$$

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

The present invention provides an ink for inkjet capable of producing images having high glossiness when applied on nonpermeable media.

More particularly, the present invention relates to an ink for inkjet, including water; two or more hydrosoluble organic solvents; a pigment; and a resin particle more than the pigment by weight, wherein a hydrosoluble organic solvent A having the smallest SP value and a hydrosoluble organic solvent B having the largest SP among the two or more hydrosoluble organic solvents satisfy the following relations (1) and (2):

$$SP \text{ value of hydrosoluble organic solvent } B - SP \text{ value of hydrosoluble organic solvent } A \geq 3 \quad (1)$$

$$\text{boiling point of hydrosoluble organic solvent } B > \text{boiling point of hydrosoluble organic solvent } A \quad (2).$$

The reason why the above effect is obtained is unclear. The hydrosoluble organic solvent A having the smallest SP value included in the ink expands the ink on a nonpermeable media to increase glossiness, but promotes aggregation of the pigment and the resin particle therein when remaining long in the ink through drying process thereof. Meanwhile, The hydrosoluble organic solvent B having the largest SP and a high boiling point prevents the pigment and the resin particle from aggregating through the drying process of the ink.

Exemplary embodiments of the present invention are described in detail below with reference to accompanying drawings. In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

The ink for inkjet includes at least a pigment, a resin particle, water and two or more hydrosoluble organic solvents. The components of the ink are explained in detail.

Pigment

Pigments are classified into organic pigments and inorganic pigments. These are selected depending on the color of ink.

(Black Pigment)

As a black pigment, carbon black (Pigment Black 7) is particularly preferable. Examples of carbon black available on market are Regal™, Black Pearls™, Elftex™, Monarch™, Mogul™, and Vulcan™ (all manufactured by Cabot Corporation); and SENSIJET™ (manufactured by SENSIENT).

Specific examples thereof include, but are not limited to, Black Pearls 2000, Black Pearls 1400, Black Pearls 1300, Black Pearls 1100, Black Pearls 1000, Black Pearls 900, Black Pearls 880, Black Pearls 800, Black Pearls 700, Black Pearls 570, Black Pearls L, Elftex 8, Monarch 1400, Monarch 1300, Monarch 1100, Monarch 1000, Monarch 900, Monarch 880, Monarch 800, Monarch 700, Mogul L, Regal 330, Monarch 400, Monarch 660, Vulcan P, SENSIJET Black SDP100 (SENSIENT), SENSIJET Black SDP 1000 (SENSIENT), and SENSIJET Black SDP 2000 (SENSIENT).

(White Pigment)

Preferable specific examples of white pigments include, but are not limited to, titanium oxide, iron oxide, calcium oxide, barium sulfate, and aluminum hydroxide.

(Color Pigment)

Specific examples of color pigments include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 139, 150, 151, 153, 155, 180, 183, 185 and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36.

The pigments can be dispersed in an ink by a dispersion method using a surfactant or a dispersible resin, a dispersion method of coating the surface of pigment with a resin, and a dispersion method of forming a self-dispersible pigment by introducing a hydrophilic group into the surface of pigment.

The pigment preferably has a specific surface area of from about 10 $m^2/g$ to about 1,500 $m^2/g$, more preferably from about 20 $m^2/g$ to about 600 $m^2/g$, and furthermore preferably about 50 $m^2/g$ to about 300 $m^2/g$.

Unless a pigment has such a desired surface area, it is suitable to reduce the size of the pigment or pulverize it by using, for example, a ball mill, a jet mill, or ultrasonic wave to have a relatively small particle diameter.

The pigment preferably has a volume-average particle diameter ($D_{50}$) in an ink of from 10 nm to 300 nm, and more preferably from 20 nm to 250 nm in terms of dispersion stability of pigment of an ink, ejection stability, image density, and productivity of ink.

The ink preferably includes the pigment in an amount of from about 0.1% by weight to about 10% by weight, and more preferably from about 1% by weight to about 5% by weight in terms of image density, fixability, and ejection stability.

Resin Particle

The ink for inkjet of the present invention includes a resin particle in the form of a resin particle dispersion formed of water in which a resin particle is dispersed.

There is no specific limit to the identity of the resin particulate. The resin particulate can be selected to each of a particular application. Specific examples thereof include, but are not limited to, emulsions of urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins. Of these, in terms of fixability and ink stability, emulsions of urethane resins or acrylic-based resins are preferable. Moreover, a dispersant such as a surfactant can be optionally added to the resin particulate. In particular, a so-called self-emulsifiable resin particulate is preferable in terms of applied film's performance. It is preferable to contain an anionic group in an acid value range of from 5 mgKOH to 100 mgKOH/g in terms of water dispersibility. To impart excellent scratch resistance and chemical resistance, it is particularly preferable that the acid value ranges from 5 mgKOH to 50 mgKOH/g. In addition, it is possible to obtain good hydrodispersion stability by using a carboxylic group, a sulfonic acid group, etc. as the anionic group. To introduce such an anionic group into a resin, it is suitable to use a monomer having such an anionic group.

Any suitably synthesized resin particles and products available on market are also usable.

Specific examples of the products available on market include, but are not limited to, SUPERFLEX® 130 (polyether-based urethane resin particulate, manufactured by DAI-ICHI KOGYO SEIYAKU CO., LTD.), JONCRYL® 537 (acrylic resin particulate, manufactured by BASF SE), Microgel E-1002 and E-5002 (styrene-acrylic-based resin particulate, manufactured by Nippon Paint Co., Ltd.), Voncoat 4001 (acrylic-based resin particulate, manufactured by Dainippon Ink and Chemicals, Inc.), Voncoat 5454 (styrene-acrylic-based resin particulate, manufactured by Dainippon Ink and Chemicals, Inc.), SAE-1014 (styrene-acrylic-based resin particulate, manufactured by Nippon Zeon Co., Ltd.), and Saivinol SK-200 (acrylic-based resin particulate, manufactured by Saiden Chemical Industry Co., Ltd.), Primal AC-22 and AC-61 (acrylic-based resin particulate, manufactured by The Dow Chemical Company), NANOCRYL SBCX-2821 and 3689 (acrylic-silicone-based resin particulate, manufactured by Toyo Ink Co., Ltd.), and #3070 (methacrylate methyl polymer resin particulate, manufactured by MIKUNI COLOR LTD.).

The resin particle of the present invention preferably has a volume-average particle diameter of from 20 nm to 40 nm. The particle diameter of the resin particle influences upon film formability, glossiness of the film, and scratch resistance. Combinations of the resin particle having a specific range of particle diameter and a solvent exert effects. The volume-average particle diameter can be measured by using a particle size analyzer (Microtrac MODEL UPA 9340, manufactured by Nikkiso Co., Ltd.).

The ink of the present invention including the resin particle more than the pigment forms images having high glossiness and scratch resistance. Including the resin particle in an amount 1.5 to 5 times of an amount of the pigment, the ink forms images having high glossiness and scratch resistance in particular.

Hydrosoluble Organic Solvent

Any hydrosoluble organic solvents such as amines, glycolethers and alcohols can be used in the ink.

The ink for inkjet of the present invention includes two or more hydrosoluble organic solvents having differences in SP values and boiling points in a specific range. SP value is calculated by Fedors method (R. F. Fedors: Polym. Eng. Sci., 14[2], 147-154 (1974). Specific examples of the solvents are shown in Table 1 with a boiling point and an SP value for each thereof.

TABLE 1

|  | Solvent | Boiling Point (° C.) | SP Value (Calculated Value) |
|---|---|---|---|
| Amines | N-methyl-2-pyrroridone | 202 | 10.1 |
|  | 1,3-dimethyl-2-imidazolidinone | 220 | 10.1 |
|  | 2-pyrroridone | 245 | 11.2 |
| Glycolethers | Ethyleneglycol monopropyl ether | 150 | 10.2 |
|  | Diethyleneglycol dimethyl ether | 162 | 8.1 |
|  | Ethyleneglycol mono-n-butyl ether | 171 | 10.0 |
|  | 3-methoxy-3-methyl-1-butanol | 174 | 9.6 |
|  | Diethyleneglycol ethyl methyl ether | 176 | 8.1 |
|  | Dipropyleneglycol monomethyl ether | 188 | 9.7 |
|  | Diethyleneglycol diethyl ether | 189 | 8.2 |
|  | Diethyleneglycol monomethyl ether | 194 | 10.3 |
|  | Diethyleneglycol monovinyl ether | 196 | 10.9 |
|  | Diethyleneglycol ethyl ether | 202 | 10.1 |
|  | Triethyleneglycol dimethyl ether | 216 | 8.4 |
|  | Diethyleneglycol monobutyl ether | 230 | 9.9 |
|  | Tripropyleneglycol monomethyl ether | 241 | 9.4 |
|  | Triethyleneglycol monomethyl ether | 249 | 10.1 |
| Alcohols | 2,3-butanediol | 183 | 12.5 |
|  | 1,2-propanediol | 187 | 13.5 |
|  | 1,2-butanediol | 194 | 12.8 |
|  | 2-methyl-2,4-pentanediol | 198 | 11.5 |
|  | 2,4-pentanediol | 201 | 12.0 |
|  | 1,3-butandiol | 203 | 12.8 |
|  | 3-methyl-1,3-butanediol | 203 | 12.1 |
|  | 2-methyl-1,3-propanediol | 213 | 12.8 |
|  | 2-ethyl-1,3-hexanediol | 244 | 9.9 |
|  | 1,3-propanediol | 214 | 13.7 |
|  | 1,2-hexanediol | 223 | 11.8 |
|  | 1,4-butanediol | 230 | 12.9 |
|  | Diethyleneglycol | 245 | 13.0 |
|  | Dipropyleneglycol | 245 | 9.5 |

The ink of the present invention needs to include plural hydrosoluble organic solvents different from each other in SP values by 3 or more. The solvent having the smallest SP value in the ink preferably has an SP value less than 10. The solvent having an SP value less than 10 preferably has a boiling point less than 185° C.

The solvent having the largest SP value in the ink preferably has an SP value not less than 12.5. The solvent having an SP value not less than 12.5 preferably has a boiling point not less than 215° C.

The ink preferably includes the hydrosoluble organic solvents in an amount of from 20% to 70% by weight, and more preferably from 30% to 60% by weight to be difficult to dry and not to have too high a viscosity, i.e., to have sufficient ejection stability.

Other Additives

Examples of other additives included in the ink include surfactants, preservatives and fungicides, corrosion inhibitors, and pH regulators.

(Surfactants)

Specific examples of the surfactants include silicone-based surfactants, fluorine-containing surfactants, amphoteric surfactants, nonionic surfactants and anionic surfactants.

There is no specific limit to the silicone-based surfactant. The silicone-based surfactant can be suitably selected to a particular application. Of these, silicone-based surfactants which are not dissolved in a high pH are preferable. Specific examples thereof include, but are not limited to, side chain-modified polydimethyl siloxane, both end-modified polydimethyl siloxane, one end-modified polydimethyl siloxane, and side chain both end-modified polydimethyl siloxane. As the modification group, it is particularly preferable to select a modified group having a polyoxyethylene group or polyoxyethylene polyoxypropylene group because these demonstrate good properties as aqueous surfactants.

It is possible to use a polyether-modified silicone-based surfactant as the silicone-based surfactant. A specific example thereof is a compound in which a polyalkylene oxide structure is introduced into the side chain of the Si portion of dimethyl siloxane.

Specific examples of the fluorine-containing surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain because these have low foaming property.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain.

Counter ions of salts in these fluorine-containing surfactants are, for example, Li, Ha, K, $NH_4$, $NH_3CH_2CH_2OH$, $NH_2(CH_2CH_2OH)_2$, and $NH(CH_2CH_2OH)_3$.

(Preservatives and Fungicides)

Specific examples of the preservatives and fungicides include, but are not limited to, 1,2-benzisothiazoline-3-on, sodium benzoate, dehydrosodium acetate, sodium sorbate, pentachlorophenol sodium, and 2-pyridine thiol-1-oxide sodium.

(Corrosion Inhibitors)

Specific examples of the corrosion inhibitors include, but are not limited to, acid sulfite, thiosodium sulfate, ammonium thiodiglycolate, diisopropyl ammonium nitrite, pentaerythritol tetranitrate, and dicyclohexyl ammonium nitrite.

(pH Regulators)

Suitably selected pH regulators can adjust the pH to a desired value without having an adverse impact on an ink to be formulated. Specific examples thereof include, but are not limited to, hydroxides of alkali metal elements such as lithium hydroxide, sodium hydroxide, and potassium hydroxide; carbonates of alkali metals such as lithium carbonate, sodium carbonate, and potassium carbonate; hydroxides of quaternary ammonium, amines such as diethanol amine and triethanol amine; ammonium hydroxide, and hydroxides of quaternary phosphonium.

The ink for use in the present disclosure can be manufactured by adding water to the formulation mentioned above by optional stirring and mixing. A stirrer using a typical stirring blade, a magnetic stirrer, a high performance disperser etc., can be used for the mixing and stirring. However, it is not limited to particular methods. Known methods are employed to particular applications.

Inkjet Recording Method

The inkjet recording method of the present disclosure includes at least a step of ejecting the ink of the present invention on a substrate.

In the ink ejection process, a stimulus is applied to an ink to eject it for image printing. The device to eject the ink is appropriately selected to particular applications without any limitation. A specific example thereof is a recording head (ink ejection head). In particular, an ink ejection device is preferable which has a head having multiple nozzle arrays and a sub-tank that accommodates an ink supplied from an ink cartridge and supplies the liquid to the head. It is preferable that the sub-tank mentioned above has a negative pressure producing device to produce a negative pressure in the sub-tank, an air releasing device to release air in the sub-tank, and a detector to detect whether there is ink therein by the difference of electric resistances.

Such a stimulus can be generated by a stimulus generating device. There is no specific limit to the stimulus mentioned above, which can be selected to a particular application. For example, heat (temperature), pressure, vibration, and light can be suitably used as the stimulus. These may be used alone or in combination of two or more thereof. Of these, heat and pressure are preferable.

Examples of the device to generate such a stimulus include a heater, a pressurization device, a piezoelectric element, a vibrator, an ultrasonic oscillator, light, etc. Specific examples thereof include, but are not limited to, a piezoelectric actuator such as the piezoelectric element, a thermal actuator that utilizes a phase change caused by film boiling of liquid using an electric heat conversion element such as a heat generating resistance, a shape-memory alloy actuator that uses the metal phase change due to temperature change, and an electrostatic actuator that utilizes an electrostatic force.

There is no specific limit to how the ink is ejected, which can be determined depending on the kind of stimuli mentioned above. For example, in a case in which "heat" is applied as the stimulus, a method can be used which includes applying thermal energy corresponding to recording signals to ink in a recording head by, for example, a thermal head to generate foams in the ink, thereby ejection and spraying the ink as droplets from the nozzles of the recording head due to the pressure of the foam. In addition, in a case in which the stimulus is "pressure", for example, a method can be used in which ink is ejected and sprayed from the nozzle holes of a recording head as droplets by applying a voltage to a piezoelectric element attached to the position of a pressure room located in the ink flow path in the recording head, thereby bending the piezoelectric element, resulting in a decrease in the volume of the pressure room.

Of these, a method ejection an ink by applying a voltage to a piezoelectric element is preferable. No heat is generated in the piezoelectric system, which is advantageous to eject an ink containing a resin. This is particularly suitable to subdue clogging in nozzles when an ink containing a small amount of wetting agent is used. In addition, to prevent non-firing of ink ascribable to clogging of nozzles, it is preferable to conduct false scanning by applying to a piezoelectric element a voltage above which ink is fired. Furthermore, it is preferable to operate ejection of an ink to an ink storing portion before false scanning reaching an amount corresponding to one page printing. In addition, it is preferable to include a scraper to scrape off the ink fixated on a receiver of false ejection. Using a wiper or a cutter is preferable as the scraper.

In addition, in the present disclosure, it is possible to provide a heater to heat a substrate to increase wet-spreading of the white ink ejected on the substrate and the ink having a different color ejected on the white ink.

As the heater (heating device), one or more known heating devices are suitably selected for use. For example, the heating device for a forced-air heating, radiation heating, conductive heating, high frequency drying, or microwave drying can be used. Such a heating device can be installed in a typical inkjet printer or externally attached thereto.

Figure 1:
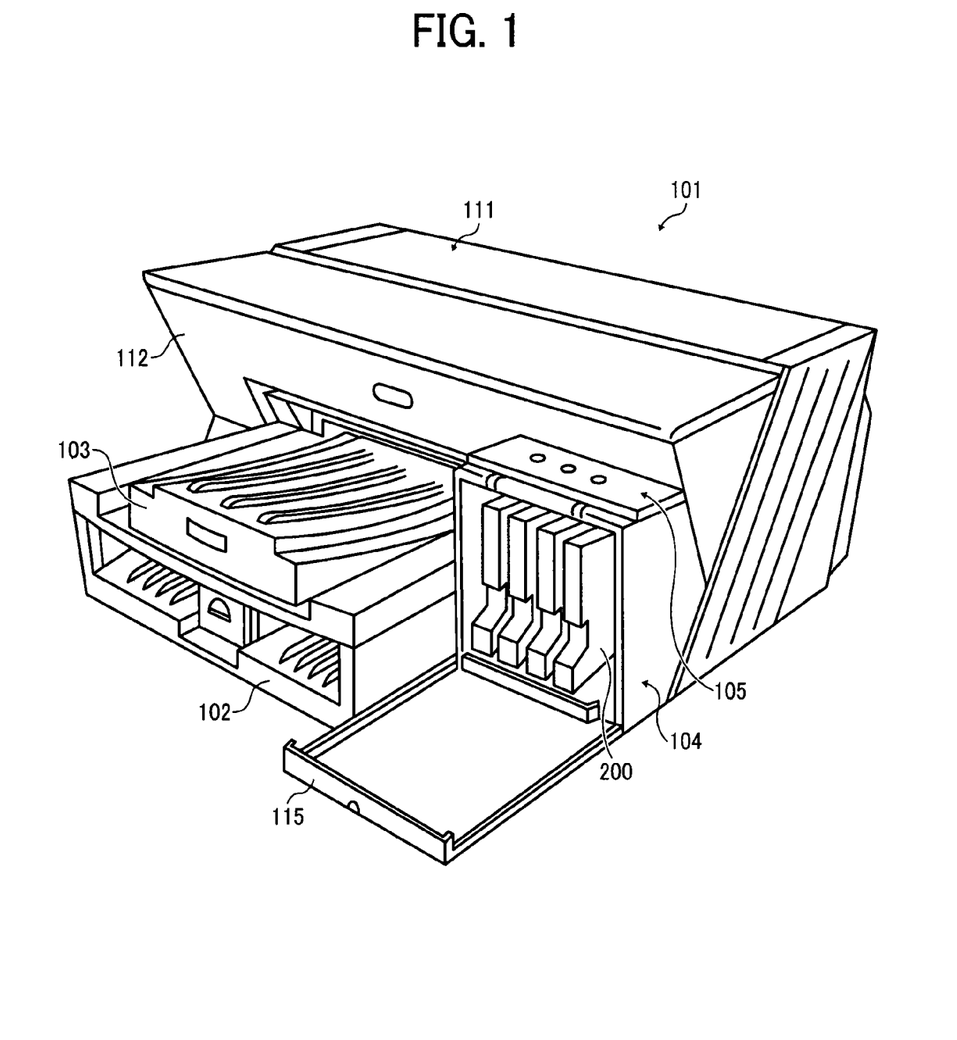
FIG. 1 is a schematic view illustrating an embodiment of the inkjet recorder of the present invention.

FIG. 1 is a schematic view illustrating an embodiment of the inkjet recorder of the present invention.

The following description applies to a serial type (shuttle type) in which a carriage scans but is also true for a line-type inkjet recording device having a line type head.

The inkjet recording device 101 illustrated in FIG. 1 has a sheet feeder tray 102 to accommodate a substrate placed in the inkjet recording device 101, an ejection tray 103 mounted on the inkjet recording device 101 to store the substrate on which images are recorded (formed), and an ink cartridge installation unit 104. On the upper surface of the ink cartridge installation unit 104 is arranged an operating portion 105 including operation keys, a display, etc. The ink cartridge installation unit 104 has a front cover 115 that is openable and closable to detach and attach an ink cartridge 200. The reference numeral 111 represents an upper cover and, 112, the front surface of the front cover.

Figure 2:
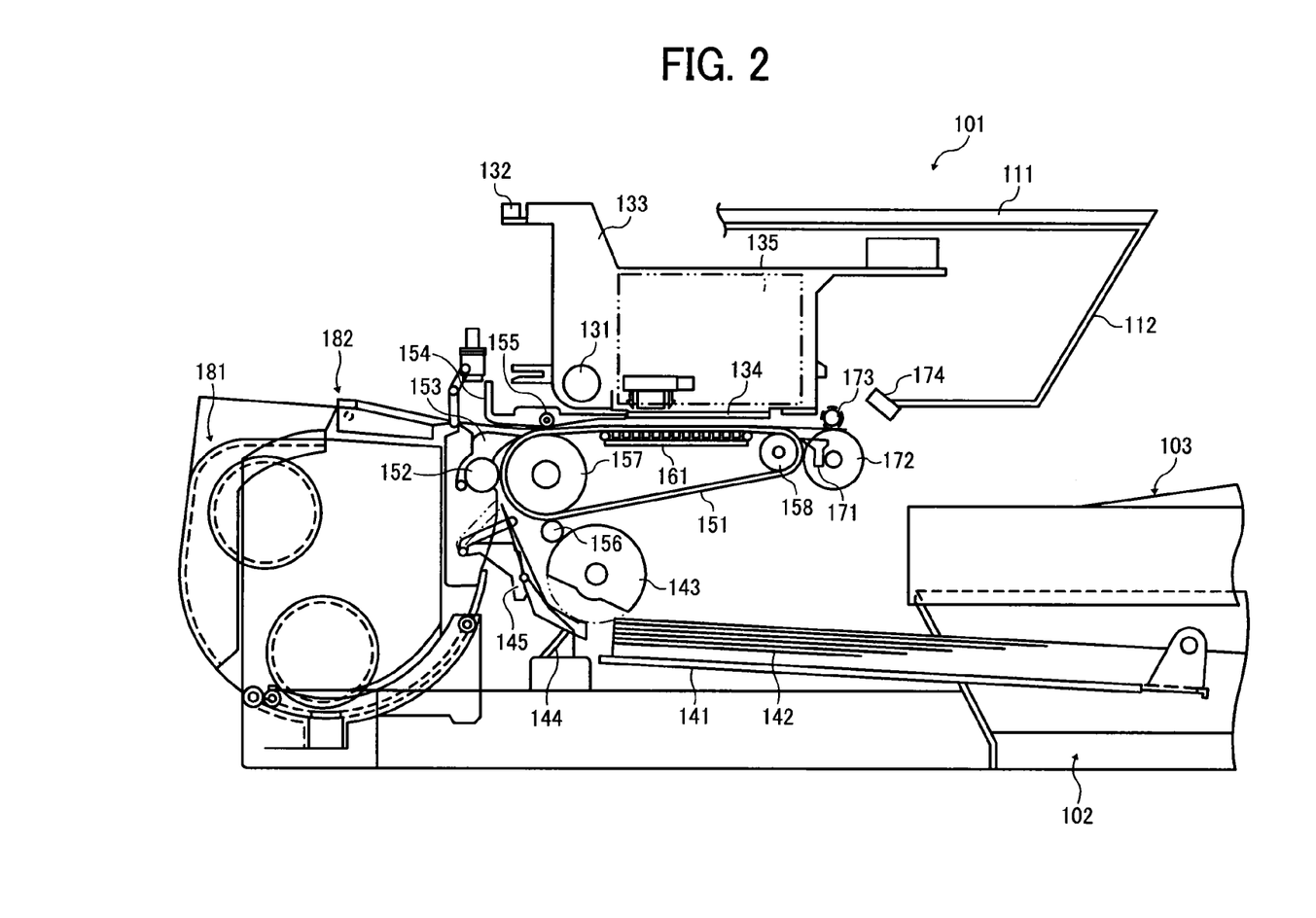
FIG. 2 is a schematic view illustrating the internal configuration of the inkjet recorder in FIG. 1.

Inside the inkjet recording device 101, as illustrated in FIG. 2, a stay 132 and a guide rod 131 serving as a guiding member that laterally bridges side plates provided on the right side and left side hold a carriage 133 slidably movable in the main scanning direction. A main scanning motor moves the carriage 133 for scanning.

The carriage 133 has a recording head 134 having five inkjet recording heads that eject ink droplets of each color of yellow (Y), cyan (C), magenta (M), black (Bk), and white (W) while multiple ink ejection mouths are arranged in the direction crossing the main scanning direction with the ink droplet ejection direction downward.

As the heads for inkjet recording that form the recording head 134, it is possible to use a device having an stimulus-generating device to eject (discharge) an ink such as a piezoelectric actuator such as a piezoelectric element, a thermal actuator that utilizes the phase change caused by film boiling of liquid by using an electric heat conversion element such as a heat resistance element, a shape-memory alloy actuator that uses the metal phase change due to the temperature change, and an electrostatic actuator that uses an electrostatic force as a stimulus generating device to eject the ink. In addition, it is also possible to have a heating mechanism to heat an ink in the recording head 134.

Moreover, the carriage 133 has sub tanks 135 for each color to supply each color ink to the recording head 134. The ink is supplied and replenished to the sub-tank 135 from the ink cartridge 200 mounted onto the ink cartridge installation unit 104 via an ink supplying tube.

A sheet feeding unit to feed a substrate 142 loaded on a substrate loader (pressure plate) 141 of the sheet feeder tray 102 includes a half-moon shape roller (sheet feeding roller 143) to separate and feed the substrate 142 one by one from the substrate loader 141 and a separation pad 144. The separation pad 144 faces the sheet feeding roller 143 and is made of a material having a large friction index and biased towards the sheet feeding roller 143. A transfer unit to transfer the substrate 142 fed from the sheet feeding unit below the recording head 134 includes a transfer belt 151 to electrostatically adsorb and transfer the substrate 142, a counter roller 152 to transfer the substrate 142 fed from the sheet feeding unit via a guide 145 while pinching the substrate 142 with the transfer belt 151, a transfer guide 153 by which the substrate 142 moves on the transfer belt 151 by changing the transfer direction of the sheet 142 being sent substantially vertically upward by substantially 90°, a front end pressure roller 155 biased towards the transfer belt 151 by a pressing member 154, and a charging roller 156 to charge the surface of the transfer belt 151.

The transfer belt 151 is an endless form belt, stretched between a transfer roller 157 and a tension roller 158 and rotatable in the belt transfer direction. This transfer belt 151 has, for example, a top layer serving as a substrate adsorption surface made of a resin material such as a copolymer (ETFE) of tetrafluoroethylene and ethylene with no resistance treatment having a thickness about 40 µm and a bottom layer (intermediate resistance layer, earth layer) made of the same material as that for the top layer with resistance treatment with carbon. On the rear side of the transfer belt 151, a guiding member 161 is arranged corresponding to the printing area by the recording head 134. An ejection unit to eject the substrate 142 on which images are recorded by the recording head 134 includes a separation claw 171 to separate the substrate 142 from the transfer belt 151, a sheet-ejection roller 172, and a sheet ejection roller 173. The substrate 142 is dried by heat wind by a fun heater 174 and thereafter output to a sheet ejection tray 103 arranged below the sheet-ejection roller 172.

A duplex printing sheet feeding unit 181 takes in and reverses the substrate 142 that is returned by the reverse rotation of the transfer belt 151 and feeds it again between the counter roller 152 and the transfer belt 151. A bypass sheet feeding unit 182 is provided on the upper surface of the duplex printing sheet feeding unit 181

In this inkjet recording device, the substrate 142 is separated and fed from the sheet feeding unit one by one substantially vertically upward, guided by the guide 145, and transferred while being pinched between the transfer belt 151 and the counter roller 152. Furthermore, the front end of the substrate 142 is guided by the transfer guide 153 and pressed against the transfer belt 151 by the front end pressure roller 155 to change the transfer direction substantially 90°. Since the transfer belt 151 is charged by the charging roller 156 at this point in time, the sheet 142 is electrostatically adsorbed to the transfer belt 151 and transferred. By driving the recording head 134 in response to the image signal by moving the carriage 133, the ink droplet is discharged to the substrate 142 not in motion to record an image in an amount of one line and thereafter the substrate 142 is transferred in a predetermined amount to be ready for the recording for the next line. In addition, when recording with the ink having a different color other than white, it is possible to transfer the substrate 142 with a predetermined amount after the droplets of the white ink are discharged onto the substrate 142 to record an image equivalent to a single line and sequentially droplets of the ink having a different color are recorded on the white ink equivalent to the amount of the single line. On receiving a signal indicating that the recording has completed or the rear end of the substrate 142 has reached the image recording area, the recording operation stops and the substrate 142 is ejected to the sheet-ejection tray 103.

The target of the image printing conducted by the inkjet recording method of the present disclosure is preferably non-porous substrates. This non-porous substrate is a resin film, laminated paper, coated paper, etc. having a surface formed of non-porous materials such as transparent or colored vinyl chloride film, polyethylene terephthalate (PET) film, acrylic film, polypropylene film, polyimide film, and polystyrene film and free from paper components such as wood pulp paper, Japanese paper, synthesized pulp paper, and synthesized fiber paper.

The inkjet recording method of the present disclosure can be applied to various recording by an inkjet recording system, for example, printers, facsimile machines, photocopiers, and printers/photocopiers/multifunction peripherals for inkjet recording in particular.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Preparation of Particulate Polymer Dispersion including Black Pigment

Preparation of Polymer Solution A

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were mixed followed by heating the system to 65° C. Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercapto ethanol, 2.4 g of azobisdimethyl valeronitrile, and 18 g of methyl ethyl ketone was dripped to the flask in two and a half hours. Subsequently, a liquid mixture of 0.8 g of azobis methyl valeronitrile and 18 g of methyl ethyl ketone was dripped to the flask in half an hour. After one-hour aging at 65° C., 0.8 g of azobismethyl valeronitrile was added followed by further one-hour aging. After the reaction was complete, 364 g of methyl ethyl ketone was added to the flask to obtain 800 g of a polymer solution A having a concentration of 50%.

Preparation of Particulate Polymer Dispersion including Black Pigment

Twenty eight (28) g of the polymer solution A, 42 g of C.I. carbon black (FW100, manufactured by Degussa AG), 13.6 g of 1 mol/l potassium hydroxide solution, 20 g of methyl ethyl ketone, and 13.6g of deionized water were sufficiently stirred followed by mixing and kneading with a roll mill. The obtained paste was charged into 200 g of deionized water followed by sufficient stirring. Methyl ethyl ketone and water were distilled away using an evaporator and coarse particles were removed by filtrating the thus-obtained liquid dispersion with a polyvinylidene fluoride membrane filter having an average hole diameter of 5.0 μm under pressure to obtain a dispersion element of polymer particulate containing black pigment having a solid portion in an amount of 15% with a solid portion concentration of 20%.

Preparation of Particulate Polymer Dispersion Including Magenta Pigment

The procedure for preparation of the above particulate polymer dispersion including a black pigment was repeated except for replacing the carbon black with the following magenta pigment:

Magenta pigment: Pigment Red 122, manufactured by Sun Chemical Corporation.

Preparation of Particulate Polymer Dispersion Including Cyan Pigment

The procedure for preparation of the above particulate polymer dispersion including a black pigment was repeated except for replacing the carbon black with the following cyan pigment:

Cyan pigment: Copper phthalocyanine pigment (C.I. Pigment Blue 15:4, Product name: LX4033), manufactured by TOYO INK CO., LTD.

Preparation of Particulate Polymer Dispersion Including Yellow Pigment

The procedure for preparation of the above particulate polymer dispersion including a black pigment was repeated except for replacing the carbon black with the following yellow pigment:

Yellow pigment: (C.I. Pigment Blue 74, Product name: Yellow No. 46,) manufactured by Dainichiseika Color & Chemicals Mfg. Co., Ltd.

Example 1

The following recipe was mixed and stirred and thereafter filtered by a 0.2 μm polypropylene filter to prepare an ink.

| | |
|---|---|
| Particulate polymer dispersion including a black pigment (solid portion 20%, solvent: water) | 20% |
| Particulate Polyether-based urethane resin SUPERFLEX ® 130 (solid portion 35%, solvent: water, manufactured by DAI-ICHI KOGYO SEIYAKU CO., LTD.) | 20% |
| Surfactant $CH_3(CH_2)12O(CH_2CH_2O)_3CH_2COOH$ | 2% |
| Diethyleneglycol diethyl ether | 10% |
| 1,3-butanediol: | 30% |
| Water | 17.9% |
| Preservatives and fungicides PROXEL LV | 0.1% |
| (from AVECIA GROUP). | 0.1% |

Examples 2 to 6 and Comparative Examples 1 to 4

The procedure for preparation of the ink in Example 1 was repeated using formulations in Table 2

In Table 3, a weight ratio of the pigment (net) in the pigment dispersion, that of the resin (net) in the resin particle, and a ratio of the resin (net) to pigment (net) are shown.

TABLE 2

| Example | Pigment Dispersion | Resin particle |
|---|---|---|
| Example 1 | Black Pigment Dispersion 20 | Particulate Urethane Resin 20 (SUPERFLEX ® 130 30 nm DAI-ICHI KOGYO SEIYAKU CO., LTD.) |
| Example 2 | Black Pigment Dispersion 20 | Particulate Urethane Resin 20 (SUPERFLEX ® 130 30 nm DAI-ICHI KOGYO SEIYAKU CO., LTD.) |
| Example 3 | Black Pigment Dispersion 20 | Particulate Urethane Resin 20 (SUPERFLEX ® 130 30 nm DAI-ICHI KOGYO SEIYAKU CO., LTD.) |
| Example 4 | Black Pigment Dispersion 20 | Particulate Urethane Resin 20 (SUPERFLEX ® 130 30 nm DAI-ICHI KOGYO SEIYAKU CO., LTD.) |
| Example 5 | Black Pigment Dispersion 20 | Particulate Urethane Resin 20 (SUPERFLEX ® 130 30 nm DAI-ICHI KOGYO SEIYAKU CO., LTD.) |
| Example 6 | Black Pigment Dispersion 25 | Particulate Urethane Resin 15 (SUPERFLEX ® 130 30 nm DAI-ICHI KOGYO SEIYAKU CO., LTD.) |
| Example 7 | Black Pigment Dispersion 15 | Particulate Urethane Resin 25 (SUPERFLEX ® 130 30 nm DAI-ICHI KOGYO SEIYAKU CO., LTD.) |
| Example 8 | Black Pigment Dispersion 10 | Particulate Urethane Resin 30 (SUPERFLEX ® 130 30 nm DAI-ICHI KOGYO SEIYAKU CO., LTD.) |
| Example 9 | Black Pigment Dispersion 20 | Particulate Urethane Resin 20 (SUPERFLEX ® 130 30 nm DAI-ICHI KOGYO SEIYAKU CO., LTD.) |
| Example 10 | Black Pigment Dispersion 20 | Particulate Urethane Resin 20 (SUPERFLEX ® 126 20 nm DAI-ICHI KOGYO SEIYAKU CO., LTD.) |
| Example 11 | Black Pigment Dispersion 20 | Particulate Urethane Resin 20 (SUPERFLEX ® 210 40 nm DAI-ICHI KOGYO SEIYAKU CO., LTD.) |

TABLE 2-continued

| Example | | |
|---|---|---|
| Example 12 | Black Pigment Dispersion 20 | Particulate Urethane Resin 20 (SUPERFLEX ® 170 10 nm DAI-ICHI KOGYO SEIYAKU CO., LTD.) |
| Example 13 | Black Pigment Dispersion 20 | Particulate Urethane Resin 20 (SUPERFLEX ® 470 50 nm DAI-ICHI KOGYO SEIYAKU CO., LTD.) |
| Example 14 | Magenta Pigment Dispersion 20 | Particulate Urethane Resin 20 (SUPERFLEX ® 130 30 nm DAI-ICHI KOGYO SEIYAKU CO., LTD.) |
| Example 15 | Cyan Pigment Dispersion 20 | Particulate Urethane Resin 20 (SUPERFLEX ® 130 30 nm DAI-ICHI KOGYO SEIYAKU CO., LTD.) |
| Example 16 | Yellow Pigment Dispersion 20 | Particulate Urethane Resin 20 (SUPERFLEX ® 130 30 nm DAI-ICHI KOGYO SEIYAKU CO., LTD.) |
| Comparative Example 1 | Black Pigment Dispersion 20 | Particulate Urethane Resin 20 (SUPERFLEX ® 130 30 nm DAI-ICHI KOGYO SEIYAKU CO., LTD.) |
| Comparative Example 2 | Black Pigment Dispersion 20 | Particulate Urethane Resin 20 (SUPERFLEX ® 130 30 nm DAI-ICHI KOGYO SEIYAKU CO., LTD.) |
| Comparative Example 3 | Black Pigment Dispersion 30 | |
| Comparative Example 4 | Black Pigment Dispersion 30 | Particulate Urethane Resin 10 (SUPERFLEX ® 130 30 nm DAI-ICHI KOGYO SEIYAKU CO., LTD.) |

| Example | Solvent 1 | Solvent 2 |
|---|---|---|
| Example 1 | Diethyleneglycol diethyl ether 10 (SP value 8.2, boiling point 189° C.) | 1,3-butanediol 30 (SP value 12.8, boiling point 203° C.) |
| Example 2 | 3-methoxy-3-methyl-1-butanediol 10 (SP value 9.6, boiling point 174° C.) | 1,3-propanediol 30 (SP value 13.7, boiling point 214° C.) |
| Example 3 | Diethyleneglycol diethyl ether 10 (SP value 8.2, boiling point 189° C.) | Dipropyleneglycol monomethyl ether 10 (SP value 9.7, boiling point 188° C.) |
| Example 4 | Diethyleneglycol diethyl ether 10 (SP value 8.2, boiling point 189° C.) | 2-pyrrolidone 10 (SP value 11.2, boiling point 245° C.) |
| Example 5 | Diethyleneglycol diethyl ether 10 (SP value 8.2, boiling point 189° C.) | 3-methoxy-3-methyl-1-butanediol 5 (SP value 9.6, boiling point 174° C.) |
| Example 6 | Diethyleneglycol diethyl ether 10 (SP value 8.2, boiling point 189° C.) | 3-methoxy-3-methyl-1-butanediol 5 (SP value 9.6, boiling point 174° C.) |
| Example 7 | Diethyleneglycol diethyl ether 10 (SP value 8.2, boiling point 189° C.) | 3-methoxy-3-methyl-1-butanediol 5 (SP value 9.6, boiling point 174° C.) |
| Example 8 | Diethyleneglycol diethyl ether 10 (SP value 8.2, boiling point 189° C.) | 3-methoxy-3-methyl-1-butanediol 5 (SP value 9.6, boiling point 174° C.) |
| Example 9 | 3-methoxy-3-methyl-1-butanediol 10 (SP value 9.6, boiling point 174° C.) | 3-methyl-1,3-butanediol 10 (SP value 12.1, boiling point 203° C.) |
| Example 10 | Diethyleneglycol diethyl ether 10 (SP value 8.2, boiling point 189° C.) | 1,3-butanediol 30 (SP value 12.8, boiling point 203° C.) |
| Example 11 | Diethyleneglycol diethyl ether 10 (SP value 8.2, boiling point 189° C.) | 1,3-butanediol 30 (SP value 12.8, boiling point 203° C.) |
| Example 12 | Diethyleneglycol diethyl ether 10 (SP value 8.2, boiling point 189° C.) | 1,3-butanediol 30 (SP value 12.8, boiling point 203° C.) |
| Example 13 | Diethyleneglycol diethyl ether 10 (SP value 8.2, boiling point 189° C.) | 1,3-butanediol 30 (SP value 12.8, boiling point 203° C.) |
| Example 14 | Diethyleneglycol diethyl ether 10 (SP value 8.2, boiling point 189° C.) | 1,3-butanediol 30 (SP value 12.8, boiling point 203° C.) |
| Example 15 | Diethyleneglycol diethyl ether 10 (SP value 8.2, boiling point 189° C.) | 1,3-butanediol 30 (SP value 12.8, boiling point 203° C.) |
| Example 16 | Diethyleneglycol diethyl ether 10 (SP value 8.2, boiling point 189° C.) | 1,3-butanediol 30 (SP value 12.8, boiling point 203° C.) |
| Comparative Example 1 | 3-methoxy-3-methyl-1-butanediol 15 (SP value 9.6, boiling point 174° C.) | 2-pyrrolidone 25 (SP value 11.2, boiling point 245° C.) |
| Comparative Example 2 | 2-ethyl-1,3-hexanediol 10 (SP value 9.9, boiling point 244° C.) | 1,3-propanediol 30 (SP value 13.7, boiling point 214° C.) |
| Comparative Example 3 | Diethyleneglycol diethyl ether 10 (SP value 8.2, boiling point 189° C.) | 1,3-butanediol 30 (SP value 12.8, boiling point 203° C.) |
| Comparative Example 4 | Diethyleneglycol diethyl ether 10 (SP value 8.2, boiling point 189° C.) | 1,3-butanediol 30 (SP value 12.8, boiling point 203° C.) |

| Example | Solvent 3 | Solvent 4 |
|---|---|---|
| Example 1 | — | — |
| Example 2 | — | — |
| Example 3 | 1,3-propanediol 20 (SP value 13.7, boiling point 214° C.) | — |
| Example 4 | 1,3-propanediol 20 (SP value 13.7, boiling point 214° C.) | — |

TABLE 2-continued

| Example | | |
|---|---|---|
| Example 5 | 2-pyrrolidone 5 (SP value 11.2, boiling point 245° C.) | 1,3-propanediol 20 (SP value 13.7, boiling point 214° C.) |
| Example 6 | 2-pyrrolidone 5 (SP value 11.2, boiling point 245° C.) | 1,3-propanediol 20 (SP value 13.7, boiling point 214° C.) |
| Example 7 | 2-pyrrolidone 5 (SP value 11.2, boiling point 245° C.) | 1,3-propanediol 20 (SP value 13.7, boiling point 214° C.) |
| Example 8 | 2-pyrrolidone 5 (SP value 11.2, boiling point 245° C.) | 1,3-propanediol 20 (SP value 13.7, boiling point 214° C.) |
| Example 9 | 1,3-propanediol 20 (SP value 13.7, boiling point 214° C.) | |
| Example 10 | | |
| Example 11 | | |
| Example 12 | | |
| Example 13 | | |
| Example 14 | | |
| Example 15 | | |
| Example 16 | | |
| Comparative Example 1 | | |
| Comparative Example 2 | | |
| Comparative Example 3 | | |
| Comparative Example 4 | | |

| Example | Surfactant | Preservative/Fungicide | Water |
|---|---|---|---|
| Example 1 | $CH_3(CH_2)_{12}O(CH_2CH_2O)_3CH_2COOH$ 2 | PROXEL LV 0.1 | 17.9 |
| Example 2 | $CH_3(CH_2)_{12}O(CH_2CH_2O)_3CH_2COOH$ 2 | PROXEL LV 0.1 | 17.9 |
| Example 3 | $CH_3(CH_2)_{12}O(CH_2CH_2O)_3CH_2COOH$ 2 | PROXEL LV 0.1 | 17.9 |
| Example 4 | $CH_3(CH_2)_{12}O(CH_2CH_2O)_3CH_2COOH$ 2 | PROXEL LV 0.1 | 17.9 |
| Example 5 | $CH_3(CH_2)_{12}O(CH_2CH_2O)_3CH_2COOH$ 2 | PROXEL LV 0.1 | 17.9 |
| Example 6 | $CH_3(CH_2)_{12}O(CH_2CH_2O)_3CH_2COOH$ 2 | PROXEL LV 0.1 | 17.9 |
| Example 7 | $CH_3(CH_2)_{12}O(CH_2CH_2O)_3CH_2COOH$ 2 | PROXEL LV 0.1 | 17.9 |
| Example 8 | $CH_3(CH_2)_{12}O(CH_2CH_2O)_3CH_2COOH$ 2 | PROXEL LV 0.1 | 17.9 |
| Example 9 | $CH_3(CH_2)_{12}O(CH_2CH_2O)_3CH_2COOH$ 2 | PROXEL LV 0.1 | 17.9 |
| Example 10 | $CH_3(CH_2)_{12}O(CH_2CH_2O)_3CH_2COOH$ 2 | PROXEL LV 0.1 | 17.9 |
| Example 11 | $CH_3(CH_2)_{12}O(CH_2CH_2O)_3CH_2COOH$ 2 | PROXEL LV 0.1 | 17.9 |
| Example 12 | $CH_3(CH_2)_{12}O(CH_2CH_2O)_3CH_2COOH$ 2 | PROXEL LV 0.1 | 17.9 |
| Example 13 | $CH_3(CH_2)_{12}O(CH_2CH_2O)_3CH_2COOH$ 2 | PROXEL LV 0.1 | 17.9 |
| Example 14 | $CH_3(CH_2)_{12}O(CH_2CH_2O)_3CH_2COOH$ 2 | PROXEL LV 0.1 | 17.9 |
| Example 15 | $CH_3(CH_2)_{12}O(CH_2CH_2O)_3CH_2COOH$ 2 | PROXEL LV 0.1 | 17.9 |
| Example 16 | $CH_3(CH_2)_{12}O(CH_2CH_2O)_3CH_2COOH$ 2 | PROXEL LV 0.1 | 17.9 |
| Comparative Example 1 | $CH_3(CH_2)_{12}O(CH_2CH_2O)_3CH_2COOH$ 2 | PROXEL LV 0.1 | 17.9 |
| Comparative Example 2 | $CH_3(CH_2)_{12}O(CH_2CH_2O)_3CH_2COOH$ 2 | PROXEL LV 0.1 | 17.9 |
| Comparative Example 3 | $CH_3(CH_2)_{12}O(CH_2CH_2O)_3CH_2COOH$ 2 | PROXEL LV 0.1 | 27.9 |
| Comparative Example 4 | $CH_3(CH_2)_{12}O(CH_2CH_2O)_3CH_2COOH$ 2 | PROXEL LV 0.1 | 17.9 |

TABLE 3

| Example | Pigment Dispersion | Pigment (Net) | Resin Particle |
|---|---|---|---|
| Example 1 | 20 | 3 | SUPERFLEX ® 130 |
| Example 2 | 20 | 3 | SUPERFLEX ® 130 |
| Example 3 | 20 | 3 | SUPERFLEX ® 130 |
| Example 4 | 20 | 3 | SUPERFLEX ® 130 |
| Example 5 | 20 | 3 | SUPERFLEX ® 130 |
| Example 6 | 25 | 3.75 | SUPERFLEX ® 130 |
| Example 7 | 15 | 2.25 | SUPERFLEX ® 130 |
| Example 8 | 10 | 1.5 | SUPERFLEX ® 130 |
| Example 9 | 20 | 3 | SUPERFLEX ® 130 |
| Example 10 | 20 | 3 | SUPERFLEX ® 126 |
| Example 11 | 20 | 3 | SUPERFLEX ® 210 |
| Example 12 | 20 | 3 | SUPERFLEX ® 170 |
| Example 13 | 20 | 3 | SUPERFLEX ® 170 |
| Example 14 | 20 | 3 | SUPERFLEX ® 130 |
| Example 15 | 20 | 3 | SUPERFLEX ® 130 |
| Example 16 | 20 | 3 | SUPERFLEX ® 130 |
| Comparative Example 1 | 20 | 3 | SUPERFLEX ® 130 |
| Comparative Example 2 | 20 | 3 | SUPERFLEX ® 130 |
| Comparative Example 3 | 30 | 4.5 | — |
| Comparative Example 4 | 30 | 4.5 | SUPERFLEX ® 130 |

| Example | Solid Content (wt %) | Resin Particle | Resin (Net) | Resin/Pigment |
|---|---|---|---|---|
| Example 1 | 35 | 20 | 7 | 2.3 |
| Example 2 | 35 | 20 | 7 | 2.3 |
| Example 3 | 35 | 20 | 7 | 2.3 |
| Example 4 | 35 | 20 | 7 | 2.3 |
| Example 5 | 35 | 20 | 7 | 2.3 |
| Example 6 | 35 | 15 | 5.25 | 1.4 |
| Example 7 | 35 | 25 | 8.75 | 3.9 |
| Example 8 | 35 | 30 | 10.5 | 7.0 |
| Example 9 | 35 | 20 | 7 | 2.3 |
| Example 10 | 30 | 20 | 6 | 2.0 |
| Example 11 | 35 | 20 | 7 | 2.3 |
| Example 12 | 35 | 20 | 6.6 | 2.2 |
| Example 13 | 35 | 20 | 7.6 | 2.5 |

TABLE 3-continued

| | | | | |
|---|---|---|---|---|
| Example 14 | 35 | 20 | 7 | 2.3 |
| Example 15 | 35 | 20 | 7 | 2.3 |
| Example 16 | 35 | 20 | 7 | 2.3 |
| Comparative Example 1 | 35 | 20 | 7 | 2.3 |
| Comparative Example 2 | 35 | 20 | 7 | 2.3 |
| Comparative Example 3 | — | — | 0 | 0.0 |
| Comparative Example 4 | 35 | 10 | 3.5 | 0.8 |

An inkjet printer remodeled based on IPSiO GXe 5500 (manufactured by Ricoh Company Ltd.) was filled with each of the above inks and a test pattern of a solid image was printed on a transparent PET sheet of non-porous substrate LLPET 1223 (manufactured by Sakurai Co., Ltd.).

Image glossiness and scratch resistance thereof were evaluated under the following standard.

Evaluation of Gloss

Gloss at 60 degrees of the solid image of black ink was measured by a gloss meter (4501, manufactured by BYK Gardener). A larger reading on gloss level means better gloss. The results were shown in Table 4.

Scratch Resistance

The solid image of black ink was scratched for 10 times with an abrasive sheet having a granularity of 9 μm (diamond wrapping film from Sumitomo 3M Limited) while applied with a load of 1 kg to measure the glossiness thereof after scratched. The results were shown in Table 4.

The glossiness higher than 70° after scratched was good, and less than 70° was poor.

TABLE 4

| | Glossiness | Scratch Resistance Glossiness | Evaluation Results |
|---|---|---|---|
| Example 1 | 87° | 79° | Good |
| Example 2 | 90° | 83° | Good |
| Example 3 | 93° | 86° | Good |
| Example 4 | 101° | 92° | Good |
| Example 5 | 102° | 94° | Good |
| Example 6 | 92° | 75° | Good |
| Example 7 | 99° | 95° | Good |
| Example 8 | 94° | 92° | Good |
| Example 9 | 96° | 80° | Good |
| Example 10 | 99° | 85° | Good |
| Example 11 | 85° | 78° | Good |
| Example 12 | 101° | 74° | Good |
| Example 13 | 81° | 75° | Good |
| Example 14 | 87° | 79° | Good |
| Example 15 | 81° | 74° | Good |
| Example 16 | 85° | 78° | Good |
| Comparative Example 1 | 68° | 54° | Poor |
| Comparative Example 2 | 71° | 59° | Poor |
| Comparative Example 3 | 54° | 38° | Poor |
| Comparative Example 4 | 62° | 48° | Poor |

As shown in Table 4, the ink for inkjet of the present invention is capable of producing images high glossiness and scratch resistance even when printed on nonpermeable media.

Having now fully described the invention, it will be apparent to one of ordinary skill in the art that many changes and modifications can be made thereto without departing from the spirit and scope of the invention as set forth therein.

What is claimed is:

1. An ink, comprising:
   water;
   two or more hydrosoluble organic solvents;
   a pigment; and
   a urethane resin particle more than the pigment by weight,
   wherein a hydrosoluble organic solvent A having the smallest SP value and a hydrosoluble organic solvent B having the largest SP among the two or more hydrosoluble organic solvents satisfy the following relations (1) and (2):

$$SP \text{ value of hydrosoluble organic solvent } B - SP \text{ value of hydrosoluble organic solvent } A \geq 3 \quad (1)$$

$$\text{boiling point of hydrosoluble organic solvent } B > \text{boiling point of hydrosoluble organic solvent } A \quad (2),$$

and wherein a content ratio by weight of the urethane resin particle to the pigment is at least 2.0.

2. The ink of claim 1, wherein a difference between the boiling point of the hydrosoluble organic solvent A and that of the hydrosoluble organic solvent B is not less than 30° C.

3. The ink of claim 1, further comprising a hydrosoluble organic solvent C satisfying the following relations:

$$SP \text{ value of hydrosoluble organic solvent } C - SP \text{ value of hydrosoluble organic solvent } A \geq 1.5$$

$$SP \text{ value of hydrosoluble organic solvent } B - SP \text{ value of hydrosoluble organic solvent } C \geq 1.5.$$

4. The ink of claim 3, wherein the boiling point of the hydrosoluble organic solvent A and a boiling point of the hydrosoluble organic solvent C satisfy the following relation:

$$\text{boiling point of the hydrosoluble organic solvent } C - \text{boiling point of the hydrosoluble organic solvent } A \geq 20° C.$$

5. The ink of claim 1, wherein a content ratio by weight of the urethane resin particle to the pigment is from 2.0 to 5.

6. The ink of claim 1, wherein the urethane resin particle has a volume-average particle diameter of from 20 to 40 nm.

7. An inkjet recording method, comprising:
   ejecting the ink according to claim 1 onto a substrate to and print an image thereon.

8. The ink of claim 1, wherein a content ratio by weight of the urethane resin particle to the pigment is from 2.2 to 5.

9. The ink of claim 1, wherein the urethane resin is a polyether-based urethane resin.

10. The ink of claim 1, wherein said ink is suitable for inkjet printing.

11. The inkjet recording method according to claim 7, wherein the substrate is a non-permeable medium.

12. The inkjet recording method according to claim 7, wherein the nonpermeable medium is a film substrate.

13. The inkjet recording method according to claim 7, wherein a difference between the boiling point of the hydrosoluble organic solvent A and that of the hydrosoluble organic solvent B is not less than 30° C.

14. The inkjet recording method according to claim 7, further comprising a hydrosoluble organic solvent C satisfying the following relations:

$$SP \text{ value of hydrosoluble organic solvent } C - SP \text{ value of hydrosoluble organic solvent } A \geq 1.5$$

$$SP \text{ value of hydrosoluble organic solvent } B - SP \text{ value of hydrosoluble organic solvent } C \geq 1.5.$$

15. The inkjet recording method according to claim 7, wherein the boiling point of the hydrosoluble organic solvent A and a boiling point of the hydrosoluble organic solvent C satisfy the following relation:

$$\text{boiling point of the hydrosoluble organic solvent } C - \text{boiling point of the hydrosoluble organic solvent } A \geq 20° \text{ C}.$$

16. The inkjet recording method according to claim 7, wherein a content ratio by weight of the urethane resin particle to the pigment is from 2.0 to 5.

17. The inkjet recording method according to claim 7, wherein the urethane resin particle has a volume-average particle diameter of from 20 to 40 nm.

18. The inkjet recording method according to claim 7, wherein the urethane resin is a polyether-based urethane resin.

* * * * *